UNITED STATES PATENT OFFICE.

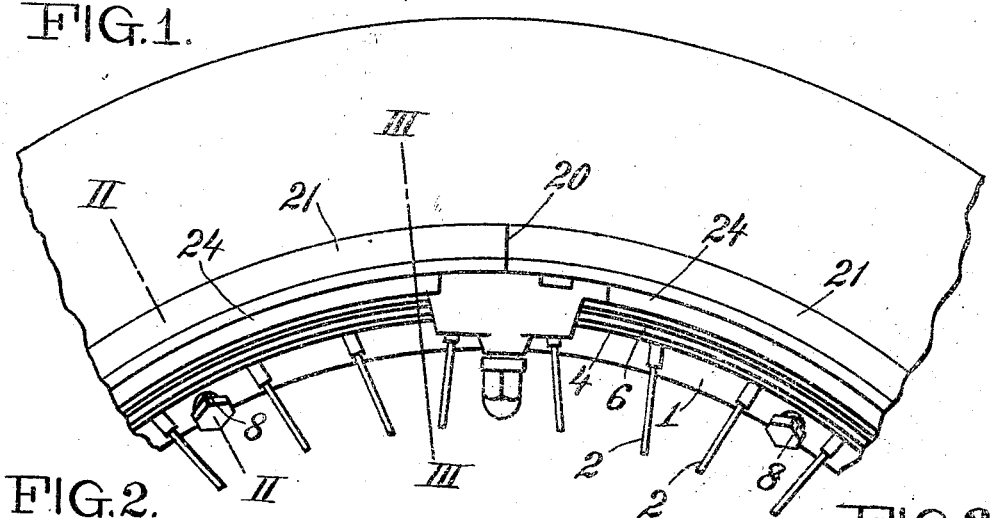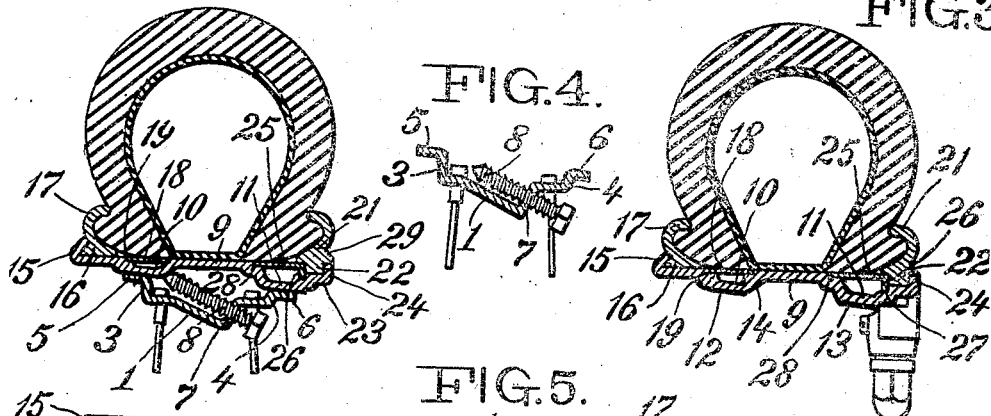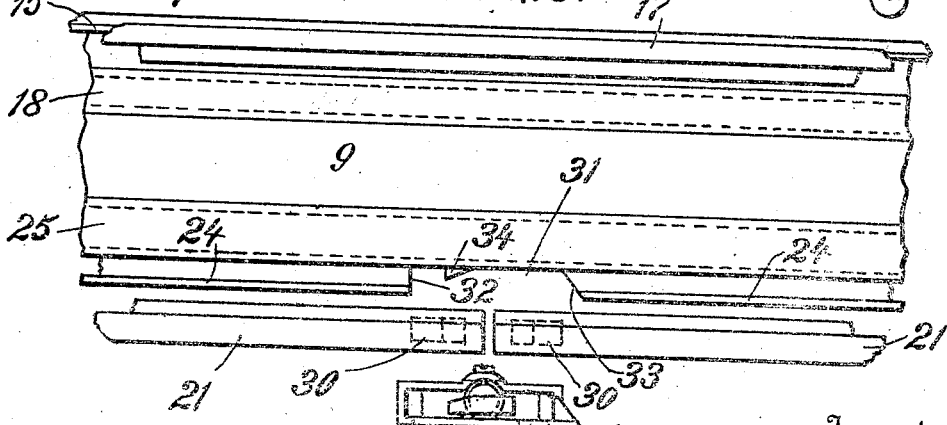

JAMES H. WAGENHORST, OF AKRON, OHIO, ASSIGNOR, BY MESNE ASSIGNMENTS, OF TWO-FIFTHS TO THE B. F. GOODRICH COMPANY, OF NEW YORK, N. Y., A CORPORATION OF NEW YORK, ONE-FIFTH TO THE GOODYEAR TIRE & RUBBER COMPANY, OF AKRON, OHIO, A CORPORATION OF OHIO, AND ONE-FIFTH TO THE UNITED STATES TIRE COMPANY, OF NEW YORK, N. Y., A CORPORATION OF NEW YORK.

VEHICLE-WHEEL RIM.

1,177,462.  Specification of Letters Patent.  Patented Mar. 28, 1916.

Original application filed April 22, 1912, Serial No. 692,256. Divided and this application filed July 20, 1915. Serial No. 40,830.

*To all whom it may concern:*

Be it known that I, JAMES H. WAGENHORST, a citizen of the United States, residing at Akron, county of Summit, and State of Ohio, have invented certain new and useful Improvements in Vehicle-Wheel Rims, of which the following is a specification.

This invention relates to rims for holding pneumatic or other resilient tires.

One object of my invention is to provide an improved demountable rim structure in which the rim carrying the tire is capable of being mounted upon a wheel felly or fixed rim and firmly secured thereto and of being quickly removed from the wheel and replaced by a duplicate rim carrying another tire. The specific improvement shown is particularly applicable to the securing of rims upon wire wheels.

Other objects of my invention will appear from the following description thereof.

In the accompanying drawings which form a part of this specification Figure 1 is a side elevation of a portion of a wire wheel showing my improved rim applied thereto, and a portion of a tire carried by the rim; Fig. 2 is a transverse section through the tire, removable rim and fixed rim on the line II—II of Fig. 1; Fig. 3 is a transverse section through the tire and removable rim, removed from the fixed rim, the position of the section being indicated by the line III—III of Fig. 1; Fig. 4 is a transverse section through the fixed rim with the tire and tire-carrying rim removed, and showing one of the attaching screws withdrawn to inoperative position; and Fig. 5 is a plan view of a portion of the tire-carrying rim showing the split detachable flange removed from its seat and the locking clamp also removed.

Referring to the drawings in detail, the numeral 1 designates the fixed rim of a vehicle wheel provided with wire spokes 2. As shown in Figs. 2 and 4, the fixed rim is the form of a rolled sheet metal channel, having flanges at each edge thereof, the flange 3 at one edge being preferably higher than the flange 4 at the other edge. These flanges are preferably bent over to form beveled bearing surfaces 5 and 6 for engagement with the tire-carrying rim. An angular offset is preferably rolled in the bottom of the channel, the steeper wall 7 of this offset being perforated at intervals by screw-threaded holes through which screw the screws 8 which are used to secure the tire-carrying rim on the fixed rim.

The tire-carrying rim to be used upon this fixed rim may be of any suitable construction, provided with seats adapted to engage the beveled surfaces 5 and 6 of the fixed rim, and having some form of abutment against which the ends of the screws 8 may press to secure the rim upon the fixed rim. The tire-carrying rim is preferably, but not necessarily provided with a removable tire retaining flange which may be secured in position in any suitable manner, as for example by means of the improved locking clamp illustrated. As shown in Figs. 1, 2, 3 and 5, the tire-carrying rim comprises a rim base 9 having depressed portions 10 and 11 rolled therein, preferably without thickening the metal of the rim base, so that the rim may be formed cold from flat stock. The inner surfaces of the depressed portions of the rim form inclined bearing surfaces 12 and 13, which engage the inclined bearing surfaces 5 and 6, respectively. The wall 14 of the depressed portion 10 of the rim, forms an abutment against which the ends of the screws 8 press, the screws 8 thus serving to wedge the rim in position upon the fixed rim and retain it in such position. Fig. 2 shows one of the screws 8 in operative position, while Fig. 4 shows the screw withdrawn. It will be seen that, owing to the inclination of the screws, by unscrewing them a few turns into the position shown in Fig. 4, the ends of the screws will be withdrawn below the level of the supporting surfaces of the fixed rim, and thus permit the tire-carrying rim to be removed from the wheel. The screws 8 are preferably given a comparatively steep inclination so that they will not have to be withdrawn very far before clearing the rim. If this inclination is sufficiently great, particularly if the inclination of the screws is greater than that of the bearing surfaces of the fixed rim or felly band, the screws will not only force the rim laterally upon the wheel, thus causing the inclined surfaces 12 and 13 to wedge upon the inclined surfaces 5 and 6, but the screws may also tend to lift the rim slightly, thus forcing it away from the surfaces 5 and 6. Such action is in no way objectionable, but rather advantageous, as the lifting of the rim opposite the screws will cause it to be drawn into tight clamping contact with the surfaces 5 and 6 throughout the space between adjacent screws. A very secure mounting of the rim upon the vehicle wheel is thus obtained.

It will be seen that the heads of the screws are very conveniently positioned, and that the screws may be operated by a brace wrench, such as is commonly used for operating demountable rims. The formation of the felly band or fixed rim with the circumferential angular offset provides a construction very easy to manufacture, adding practically nothing to the cost of the wheel. It at the same time provides excellent bearings for the screws 8 and makes a wheel of very attractive appearance.

The rim base 9 beyond the depression 10 is formed into a flange 15 which is preferably inwardly hooked as shown, so as to engage the base 16 of a reversible endless tire-retaining flange 17. The particular construction of this tire-retaining flange is not, however, a part of the present invention, it being claimed in my application filed July 22, 1911, Serial Number 639,953, and the rim base may be provided with an integral, or any other form of tire-retaining flange desired. In order to provide the rim with a flush tire-seating surface, the depression 10 may be covered by a band 18, which is preferably formed of an endless strip of metal, shrunk into shallow recesses 19 formed at the sides of the depression 10 to receive the edges of the band.

As above stated, the rim is preferably provided with a removable tire-retaining flange, this flange in the form of my invention illustrated being transversely split at the point 20. This flange, which is designated by the numeral 21, is provided with a base 22 which is received in a channel in the rim. This channel is preferably formed by carrying the rim base beyond the depression 11 to provide a cylindrical seat 23 and a vertical retaining flange 24. In order to cover the depression 11 and provide a smooth seating surface for the tire, a band 25 is used, this band having a vertical leg 26 which seats in a recess 27 formed by offsetting the rim base, the side of this vertical leg 26 completing the channel for the reception of the base 22 of the flange 21. The band 25 is preferably shrunk into position in the same way as the band 18, the edge of the cylindrical portion of the band being received in the shallow recess 28.

The flange 21 is reversible and may be of practically the same construction as the split tire-retaining flange shown in the patent to Bryant above referred to. I prefer, however, to form in that side of the flange designed to engage a straight-sided tire, an annular groove 29. I have found that the formation of such a groove in this face of the flange in no way interferes with the satisfactory retaining of a straight-sided tire, while the amount of metal removed by the formation of such a groove is sufficient to result in a material reduction in weight of the rim.

The flange 21 is provided at its ends with lugs 30 which project through a slot 31 cut in the channel portion of the rim, such slot being clearly illustrated in Fig. 5. It preferably has one end wall, 32, formed at right angles to the edge of the rim, the other end wall 33 being inclined or beveled. In applying the flange to the rim, one of the lugs 30 is placed against the wall 32 and the base 22 of the flange pressed into the channel, the beveled wall 33 serving to guide the lug 30 at the opposite end of the flange into position, and to draw the ends of the flange toward each other. A small lug 34 is preferably provided on a line with the bottom of the channel, to engage the first lug 30 and prevent the same from slipping away from the wall 32 of the slot.

For securing the lugs 30 together and to the rim, and thus holding the split tire-retaining flange in position upon the rim, I prefer to use the improved locking clamp shown in Figs. 1, 3 and 5, described and claimed in my co-pending application Serial Number 692,256, filed April 22, 1912.

It will be seen from the foregoing description of my invention that I have provided a rim structure in which the tire-carrying rim may be detachably but firmly secured upon the fixed rim of a wheel, the securing means permitting of the ready removal and replacement of the rim.

While I have shown in the drawings and specifically described a certain preferred embodiment of my invention, it is to be understood that I do not intend to limit myself to the details illustrated, but that my invention is capable of modification and of being embodied in other structures.

This application is a division of my application filed April 22, 1912, Serial No. 692,256, now pending.

Having thus described my invention, I claim:

1. In a vehicle wheel, in combination, a rolled channel-shaped metallic fixed rim having an angular offset rolled in the bottom thereof, a tire-carrying rim adapted to seat upon the legs of said channel, and inclined screws passing through one wall of the angular offset formed in the bottom of said channel, the ends of said screws adapted to engage portions of said tire-carrying rim when the screws are moved to operative position, the ends of said screws lying out of the path of any portion of said tire-carrying rim when moved to inoperative position.

2. In a vehicle wheel, in combination, a rolled channel-shaped metallic fixed rim having an angular offset rolled in the base thereof, a tire-carrying rim adapted to seat upon the legs of said channel, and inclined retaining members passing through said offset portion of the base, the extremities of said retaining members being adapted to engage portions of said rim when said members are moved to operative position, said extremities lying out of the path of said tire-carrying rim when moved to inoperative position.

3. In a vehicle wheel, a rolled channel-shaped metallic fixed rim having an angular offset rolled in the bottom thereof, one side of said channel being higher than the other, a tire carrying rim having depressed portions rolled therein, one higher than the other, the inner surface of the lower of said depressed portions adapted to seat upon the higher side of said channel, the inner surface of the higher of said depressed portions adapted to seat upon the lower side of said channel, and inclined screws passing through one of the walls of said angular offset, the ends of said screws adapted to abut against the side of the lower depressed portion of said tire-carrying rim and secure it upon said fixed rim.

4. In a vehicle wheel adapted to receive a demountable tire-carrying rim, a metallic fixed rim consisting of a channel of uniform thickness having upstanding flanges of unequal height, the web of said channel having an angular depression rolled therein, offset from the plane of the wheel, the longer side of said depression being nearer the higher flange.

5. A fixed rim for vehicle wheels comprising a metallic channel of uniform thickness and irregular cross-section, the rear flange of said channel having an outwardly beveled bearing surface, the front flange of said channel having an inwardly beveled bearing surface, the web of said channel adjacent said flanges presenting cylindrical portions adapted to receive the ends of wire spokes, the intermediate portion of said web being rolled into a centrally depressed groove whose walls are unequal, the shorter wall being nearer the front flange.

6. A fixed rim for vehicle wheels consisting of a metallic channel of uniform thickness presenting a plurality of circumferential surfaces, the two outermost of said surfaces being at unequal distances from the axis of the wheel; two intermediate surfaces at a lesser distance from said axis; and two innermost surfaces nearest said axis.

7. A fixed rim for wire wheels, comprising a metallic channel having an outwardly projecting flange constituting a bearing surface for seating a demountable rim, and an inwardly projecting angular groove in the web of said channel, offset circumferentially from the plane of the wheel, the wall of said groove more remote from said flange being adapted to receive a screw at such inclination that it may bear against the demountable rim seated on said flange.

JAMES H. WAGENHORST.